(12) United States Patent
Ogawa (10) Patent No.: US 8,867,012 B2
(45) Date of Patent: Oct. 21, 2014

(54) LIQUID CRYSTAL DEVICE AND ELECTRONIC EQUIPMENT

(75) Inventor: Akihiro Ogawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 148 days.

(21) Appl. No.: 13/049,152

(22) Filed: Mar. 16, 2011

(65) Prior Publication Data

US 2011/0234927 A1 Sep. 29, 2011

(30) Foreign Application Priority Data

Mar. 24, 2010 (JP) .................................. 2010-067545

(51) Int. Cl.
*G02F 1/1339* (2006.01)
*G02F 1/1333* (2006.01)

(52) U.S. Cl.
CPC ........ *G02F 1/1339* (2013.01); *G02F 1/133351* (2013.01)
USPC .......................................... 349/153; 349/190

(58) Field of Classification Search
CPC .. G02F 1/1339; G02F 1/1341; G02F 1/13452
USPC ................................................. 349/153, 190
See application file for complete search history.

(56) References Cited

U.S. PATENT DOCUMENTS

| | | | |
|---|---|---|---|
| 5,953,094 A * | 9/1999 | Matsuoka et al. | 349/153 |
| 6,433,767 B1 | 8/2002 | Murade | |
| 6,433,841 B1 | 8/2002 | Murade et al. | |
| 2002/0145683 A1 | 10/2002 | Murade et al. | |
| 2002/0163611 A1 * | 11/2002 | Kamijima et al. | 349/122 |
| 2002/0175888 A1 | 11/2002 | Murade | |
| 2003/0184705 A1 | 10/2003 | Murade et al. | |
| 2007/0121050 A1 | 5/2007 | Toriyama et al. | |
| 2008/0002134 A1 * | 1/2008 | Jeong | 349/153 |
| 2008/0178997 A1 | 7/2008 | Kamiya et al. | |
| 2010/0002182 A1 * | 1/2010 | Lee et al. | 349/154 |
| 2010/0173433 A1 * | 7/2010 | Park et al. | 438/27 |

FOREIGN PATENT DOCUMENTS

| | | |
|---|---|---|
| JP | 2000-081636 A | 3/2000 |
| JP | 2003-029275 A | 1/2003 |
| JP | 2003-280007 A | 10/2003 |
| JP | 2005-156752 A | 6/2005 |
| JP | 2006-098441 A | 4/2006 |
| JP | 2008-134447 A | 6/2008 |

* cited by examiner

*Primary Examiner* — Thanh-Nhan P Nguyen
(74) *Attorney, Agent, or Firm* — ALG Intellectual Property, LLC (57) ABSTRACT

In a liquid crystal device, a shoulder portion configured to increase the distance between a element-substrate-side substrate body and a opposed-substrate-side substrate body is provided on the opposed-substrate-side substrate body in an area overlapped with a sealing material including a gap material. Therefore, in an area inside the sealing material, the gap between the element substrate and the opposed substrate is smaller than the gap therebetween in the area overlapped with the sealing material. Therefore, the layer thickness of the liquid crystal layer can be reduced without reducing the size of the gap material.

12 Claims, 9 Drawing Sheets

CONVENTIONAL ART

FIG. 9B

CONVENTIONAL ART

LIQUID CRYSTAL DEVICE AND ELECTRONIC EQUIPMENT

Japanese Patent Application No. 2010-067545, filed Mar. 24, 2010 is incorporated by reference in its entirety herein.

BACKGROUND

1. Technical Field

The present invention relates to a liquid crystal device having an element substrate and an opposed substrate bonded to each other with a sealing material and an electric apparatus having the liquid crystal device.

2. Related Art

Figure 9A:
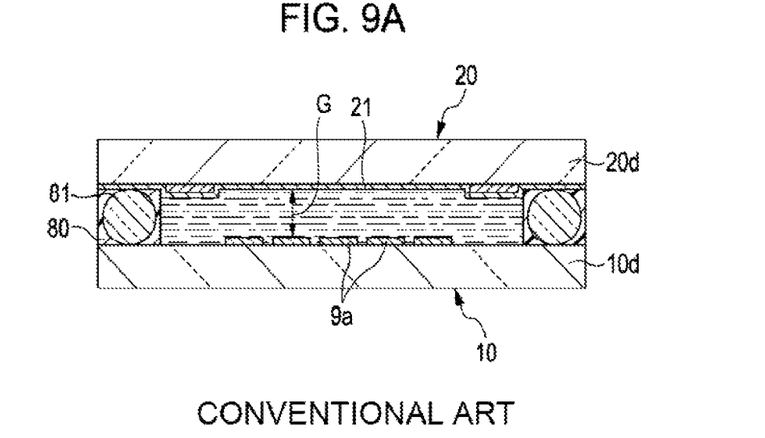
FIGS. 9A and 9B are explanatory drawings showing configurations relating to film thickness control for a liquid crystal layer in a liquid crystal device in the related art.

As shown in FIG. 9A, a liquid crystal device includes an element substrate 10 and an opposed substrate bonded to each other with an annular sealing material 80. The element substrate 10 includes a plurality of pixel electrodes 9a on one surface of an element-substrate-side substrate body 10d. The opposed substrate 20 includes a common electrode 21 on one surface of an opposed-substrate-side substrate body 20d. The sealing material 80 includes a bead-type or fiber-type gap material 81 for controlling a distance between the element substrate 10 and the opposed substrate 20. Therefore, a predetermined gap G is secured between the element substrate 10 and the opposed substrate 20, and a liquid crystal layer 50 is arranged in the gap G. The one surface of the element-substrate-side substrate body 10d and the one surface of the opposed-substrate-side substrate body 20d both are flat entirely including an area overlapped with the sealing material 80 and an area surrounded by the sealing material 80. Therefore, the thickness of the liquid crystal layer 50 is controlled to a predetermined value according to the size of the gap material 81 (See JP-A-2003-303428).

Figure 9B:
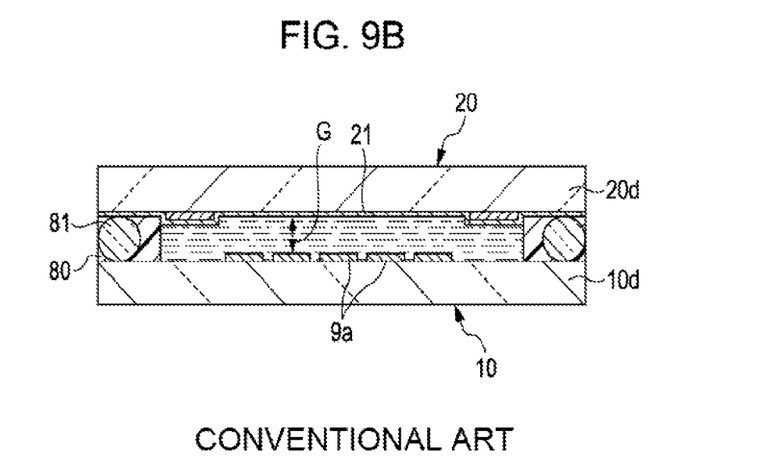

In the liquid crystal device, in order to improve a response of the liquid crystal layer 50, the layer thickness of the liquid crystal layer 50 is preferably reduced. However, in order to reduce the layer thickness of the liquid crystal layer 50 to, for example, approximately 1.8 μm in the liquid crystal device shown in FIG. 9A, it is necessary to use a gap material having an outer diameter of 1.9 μm, which is smaller than those in the related art, as the gap material 81 as shown in FIG. 9B. However, reduction of the outer diameter of the gap material 81 to a level smaller than 2.0 μm is difficult because of constraints in terms of manufacture. Therefore, there is a problem that it is difficult to reduce the layer thickness of the liquid crystal layer 50 to a level smaller than 1.9 μm.

In particular, in the case of a reflective-type liquid crystal device, reduction of the layer thickness of the liquid crystal layer 50 is required in order to provide brightness equivalent to that of a transmissive-type liquid crystal device. In other words, in the case of the reflective-type liquid crystal device, light passes through the liquid crystal layer 50 twice. Therefore, in order to obtain the equivalent brightness by securing the same optical path length as the transmissive liquid crystal device, the layer thickness of the liquid crystal layer 50 is required to be reduced to approximately half the thickness of the transmissive liquid crystal device. In this case as well, there is a problem that reduction of the outer diameter of the gap material 81 is difficult and hence reduction of the layer thickness of the liquid crystal layer 50 is difficult.

SUMMARY

An advantage of some aspects of the invention is that a liquid crystal device which achieves reduction of the layer thickness of a liquid crystal layer without reducing the size of a gap material, and an electronic apparatus having the liquid crystal device are provided.

According to a first aspect of the invention, there is provided a liquid crystal device including: an element substrate having a plurality of pixel electrodes on one surface thereof; an opposed substrate holding a liquid crystal layer in cooperation with the one surface of the element substrate; a sealing material including a gap material that controls the distance between the element substrate and the opposed substrate and bonds the element substrate and the opposed substrate to each other; and a shoulder portion provided in an area overlapped with the sealing material in at least one of an element-substrate-side substrate body used for the element substrate and an opposed-substrate-side substrate body used for the opposed substrate for increasing the distance between the one substrate body and the other substrate body in the area overlapped with the sealing material seal member to be larger than the distance between the one substrate body and the other substrate body in an area surrounded by the sealing material.

As described above, a shoulder portion is provided in the area overlapped with the sealing material in at least one of the element-substrate-side substrate body and the opposed-substrate-side substrate body for increasing the distance between the one substrate body and the other substrate body in the area overlapped with the sealing material seal member to be larger than the distance between the one substrate body and the other substrate body in the area surrounded by the sealing material. Therefore, while a gap between the element substrate and the opposed substrate is large in the area overlapped with the sealing material, a gap between the element substrate and the opposed substrate is small in the area inside the sealing material. Therefore, the layer thickness of the liquid crystal layer can be reduced without reducing the size of the gap material, so that improvement of the response of the liquid crystal layer is achieved.

Preferably, the shoulder portion is provided on the opposed-substrate-side substrate body. In this configuration, there is such advantage that it is not necessary to increase the size of the opposed-substrate-side substrate body. More specifically, the shoulder portion may be provided on the element-substrate-side substrate body. However, since wiring or the like are often formed on the element-substrate-side substrate body in the area overlapped with the sealing material, formation of useless shoulders is preferably avoided. Therefore, when providing the shoulder portion on the element-substrate-side substrate body, there are many constrains such that the shoulder portion needs to be provided in an area except for positions where the wiring passes through. Therefore, although the element substrate is upsized if the shoulder portion is provided on the element substrate, it is not necessary to upsize the opposed substrate if the shoulder portion is provided on the side of the opposed substrate because there is no such constraints.

Preferably, the shoulder portion is provided on an outer peripheral edge of the opposed-substrate-side substrate body.

Preferably, the shoulder portion is defined by a groove provided inside the outer peripheral edge of the opposed-substrate-side substrate body at a distance therefrom.

Preferably, an inter-substrate conductive material is provided between the element substrate and the opposed substrate, and the inter-substrate conductive material provides continuity between the element substrate and the opposed substrate in an area overlapped with the shoulder portion. Here, since the inter-substrate conductive material is prepared by blending conductive particles such as silver powder or gold plated fibers in an adhesive agent component, the element substrate side and the opposed substrate side can be brought into continuity without using the small sized conductive particles by providing the inter-substrate conductive material in the area overlapped with the shoulder portion.

Preferably, the side surface of the shoulder portion is tapered. In this configuration, there is such advantage that breakage due to the level difference can hardly occur even when provision of an electrode or the like on the side surface of the shoulder portion is needed.

Preferably, the shoulder portion is formed by etching with respect to the one substrate body. The etching has such advantage that depressions can be formed efficiently on a number of pieces of substrate bodies in comparison with machining such as grinding.

The invention is more effective when being applied to a reflective liquid crystal device in which one of the element substrate and the opposed substrate includes a reflective layer configured to reflect light incident from the other substrate toward the other substrate. In the reflective-type liquid crystal device, light passes through the liquid crystal layer twice. Therefore, the layer thickness of the liquid crystal layer must be reduced to about half that in a transmissive liquid crystal device. However, according to the embodiments of the invention, the thickness of the liquid crystal layer can be reduced without reducing the outer diameter of the gap material.

According to a second aspect of the invention, the liquid crystal device can be used in various types of electronic apparatuses. When the projecting-type display device is configured as an electronic apparatus, the projecting-type display device includes the liquid crystal device according to the first aspect of the invention, and the light source unit configured to supply light to the liquid crystal device, and the projecting optical system configured to project light modulated by the liquid crystal device. The liquid crystal device according to the first aspect of the invention may be used for configuring a display unit in electronic apparatuses such as mobile phone sets or mobile computers.

BRIEF DESCRIPTION OF THE DRAWINGS

The invention will be described with reference to the accompanying drawings wherein like numbers reference like elements.

DESCRIPTION OF EXEMPLARY EMBODIMENTS

Referring now to the drawings, embodiments of the invention will be described. In the drawings referenced in the description given below, scaling is differentiated among respective layers or members in order to make the respective layers and members recognizable in the drawings. When the direction of electric current flowing in a field-effect transistor is inverted, roles of sources and drains are switched. However, in the description given below, a side where pixel electrodes are connected is considered as a drain, and a side where data lines are connected is considered as a source for the sake of convenience. In the description given below, same reference numerals are assigned to corresponding members so as to make the correspondence with the configuration described with reference to FIGS. 9A and 9B clear to understand.

First Embodiment

General Configuration

Figure 1:
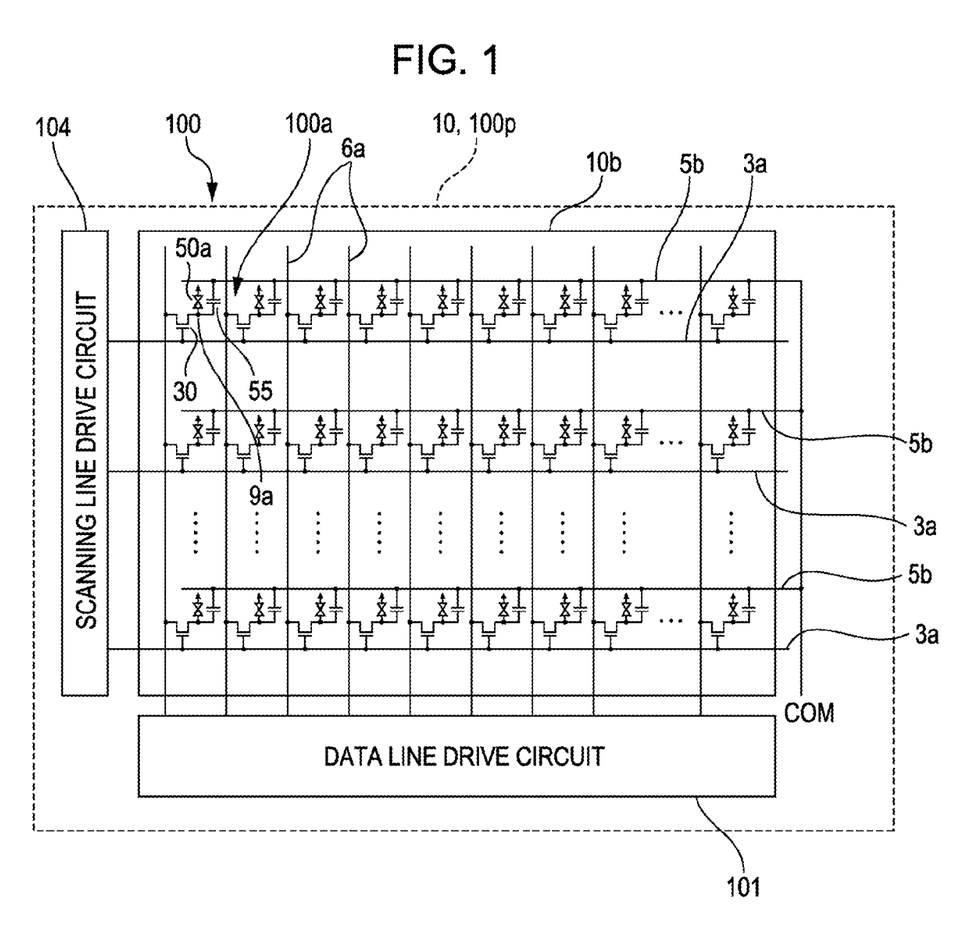
FIG. 1 is a block diagram showing an electric configuration of a liquid crystal device according to a first embodiment of the invention.

FIG. 1 is a block diagram showing an electric configuration of a liquid crystal device according to a first embodiment of the invention. In FIG. 1, a liquid crystal device 100 includes a liquid crystal panel 100$p$ of a TN (Twisted Nematic) mode or a VA (Vertical Alignment) mode, and the liquid crystal panel 100$p$ includes a pixel area 10$b$ in which a plurality of pixels 100$a$ are aligned in a matrix pattern in a center area thereof. In the liquid crystal panel 100$p$, an element substrate 10, described later, includes a plurality of data lines 6$a$ and a plurality of scanning lines 3$a$ extend vertically and laterally inside the pixel area 10$b$, and pixels 100$a$ located at positions corresponding to intersections of the data lines 6$a$ and the scanning lines 3$a$. Each of a plurality of the pixels 100$a$ is formed with a pixel transistor 30 formed of a field-effect transistor and a pixel electrode 9$a$, described later. The data lines 6$a$ are electrically connected to sources of the pixel transistors 30. The scanning lines 3$a$ are electrically connected to gates of the pixel transistors 30. The pixel electrodes 9$a$ are electrically connected to drains of the pixel transistors 30.

The element substrate 10 includes a scanning line drive circuit 104 and a data line drive circuit 101 on the outer peripheral side with respect to the pixel area 10$b$. The data line drive circuit 101 is electrically connected to an end of each of the data lines 6$a$, and supplies image signals supplied from an image processing circuit to the respective data lines 6$a$ in sequence. The scanning line drive circuit 104 is electrically connected to an end of each of the scanning lines 3$a$, and supplies scanning signals to the respective scanning lines 3$a$ in sequence.

In each of the pixels 100$a$, the pixel electrode 9$a$ opposes a common electrode formed on an opposed substrate, described later, via a liquid crystal layer and constitutes a liquid crystal capacity 50$a$. The pixels 100$a$ each include a retention capacity 55 added thereto in parallel to the liquid crystal capacity 50$a$ in order to prevent fluctuations of image signals retained in the liquid crystal capacity 50$a$. In this embodiment, in order to configure the retention capacities 55, capacitance lines 5$b$ extending in parallel to the scanning lines 3$a$ are formed across a plurality of pixels 100$a$. The capacitance lines 5$b$ are connected to a common potential line (COM), and are retained to a predetermined potential. The retention capacities 55 may be formed between the capacitance lines 5b and the scanning lines 3a on the upstream side thereof.

Detailed Configuration of Liquid Crystal Panel 100p

Figure 2A:
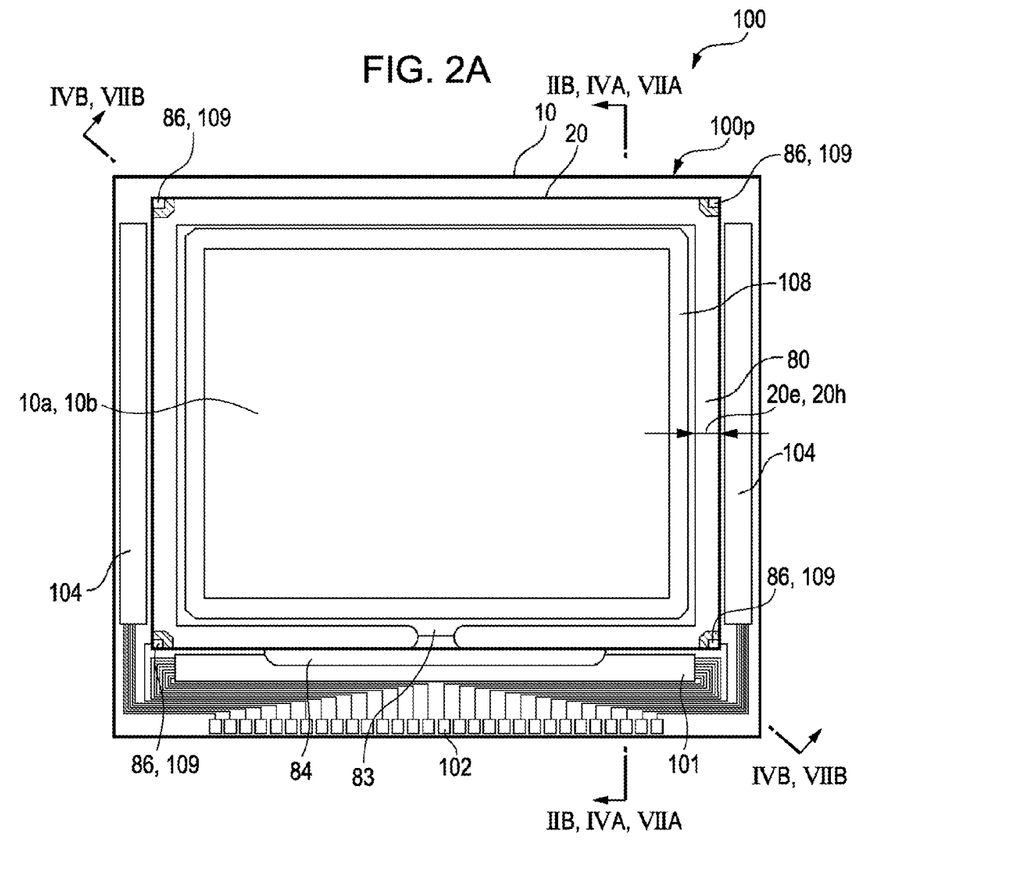
FIGS. 2A and 2B are explanatory drawings showing a detailed configuration of a liquid crystal panel used in the liquid crystal device according to the first embodiment of the invention.
Figure 2B:
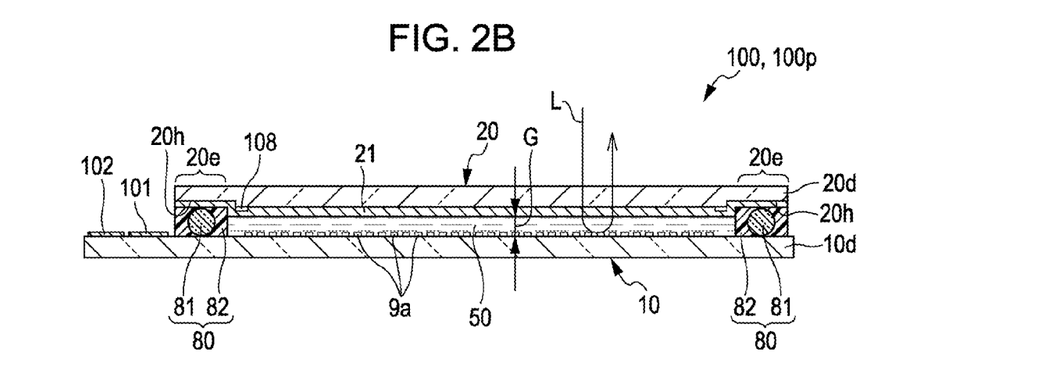

FIGS. 2A and 2B are explanatory drawings showing detailed configurations of the liquid crystal panel 100p used in the liquid crystal device 100 according to the first embodiment of the invention. FIG. 2A is a front view of the liquid crystal panel 100p of the liquid crystal device 100 according to the first embodiment viewed from the side of the opposed substrate together with respective components provided thereon. FIG. 2B is a cross-sectional view taken along the line IIB-IIB in FIG. 2A.

As shown in FIGS. 2A and 2B, the liquid crystal panel 100p includes the element substrate 10 and the opposed substrate 20 bonded to each other with the sealing material 80 via a predetermined gap therebetween, and the sealing material 80 is arranged in an annular shape so as to extend along an outer peripheral edge of the opposed substrate 20. The sealing material 80 includes an adhesive agent portion 82 formed of photo-curing resin or thermosetting resin and gap materials 81 such as glass fibers or glass beads. The gap materials 81 are dispersed in the adhesive agent portion 82.

In the liquid crystal panel 100p as described above, a liquid crystal layer 50 is retained between the element substrate 10 and the opposed substrate 20 within an area surrounded by the sealing material 80. The sealing material 80 is formed with a partly disconnected portion and the disconnected portion is used as a liquid crystal injection port 83. The liquid crystal injection port 83 is filled with sealing resin 84 after having injected the liquid crystal. The sealing resin 84 may be the one with no gap material blended therein.

The liquid crystal injection port 83 and the sealing resin 84 are not necessary when manufacturing the liquid crystal panel 100p by applying the sealing material 80 to the element substrate 10 or the opposed substrate 20 into an annular shape, then providing the liquid crystal within the area surrounded by the sealing material 80, and then bonding the element substrate 10 and the opposed substrate 20 with the sealing material 80.

The element-substrate-side substrate body 10d used for the element substrate 10 is, for example, a quartz substrate, a glass substrate, or a silicon substrate. The opposed-substrate-side substrate body 20d used for the opposed substrate 20 is, for example, a quartz substrate or a glass substrate. When configuring the liquid crystal panel 100p as a reflective-type liquid crystal panel, one of the element-substrate-side substrate body 10d and the opposed-substrate-side substrate body 20d which is located on the side which receives external light incident thereon is required to have a light-transmissive property. However, the other substrate body does not have to have the light-transmissive property. In contrast, when configuring the liquid crystal panel 100p as a transmissive-type liquid crystal panel, both of the element-substrate-side substrate body 10d and the opposed-substrate-side substrate body 20d are required to have the light-transmissive property.

In the element substrate 10, the data line drive circuit 101 and a plurality of terminals 102 are formed in an area outside the sealing material 80 along one side of the element substrate 10 on one surface of the element-substrate-side substrate body 10d, and the scanning line drive circuit 104 is formed along another side adjacent to the one side.

Although detailed description will be given later, the pixel transistors 30 and the pixel electrodes 9a to be electrically connected to the pixel transistors 30 described in conjunction with FIG. 1A are formed in a matrix pattern on the one surface of the element-substrate-side substrate body 10d. In the opposed substrate 20, an edge frame 108 formed of a light-blocking material is formed in an area inside the sealing material 80 on one surface of the opposed-substrate-side substrate body 20d, and an area inside thereof is an image display area 10a. The one surface of the opposed-substrate-side substrate body 20d is also formed with a common electrode 21. The common electrode 21 is formed substantially over an entire surface of the opposed-substrate-side substrate body 20d or across a plurality of the pixels 100a as a plurality of band-shaped electrodes. When configuring the liquid crystal device 100 as the reflective-type liquid crystal panel, one of the pixel electrodes 9a and the common electrode 21 located on the side receiving external light incident thereon is required to have the light-transmissive property, and the other electrode is required to have a reflecting property. In contrast, when configuring the liquid crystal panel 100p as a transmissive-type liquid crystal panel, both of the pixel electrodes 9a and the common electrode 21 are required to have the light-transmissive property.

An inter-substrate conductive material 86 for providing electrical continuity between an inter-substrate conductive electrode 109 of the element substrate 10 and the common electrode 21 of the opposed substrate 20 is formed at least at one of corners of the opposed substrate 20 on the outside of the sealing material 80. The inter-substrate conductive material 86 is prepared by blending conductive particles such as silver powder or gold plate fibers in an epoxy resin adhesive agent component.

The liquid crystal device 100 may be used as a color display device for electronic apparatuses such as mobile computers and a cellular phone sets. In this case, a color filter (not shown) or a protective film is formed on the side of the opposed substrate 20. In the liquid crystal device 100, a polarizing film, a retardation film, or a polarizing plate is arranged in predetermined orientations with respect to the liquid crystal panel 100p according to the type of the used liquid crystal layer 50 or modes, such as a normally-white mode or a normally-black mode. Furthermore, the liquid crystal devices 100 may be used as light valves for RGB in a projecting-type display device (liquid crystal projector) described later. In this case, the color filter is not formed because lights in respective colors separated by a dichroic mirror for separating RGB colors enter the respective liquid crystal devices 100 for RGB colors.

A case in which the liquid crystal device 100 is a reflective-type liquid crystal device, and the pixel electrodes 9a are formed of a reflective conductive film (reflective layer), and the common electrode 21 is formed of a light-transmissive conductive film is exemplified below. In this configuration, as indicated by an arrow L in FIG. 2B, light incident from the side of the opposed substrate 20 is modulated by the liquid crystal layer 50 while the light is reflected from the pixel electrodes 9a and ejected from the side of the opposed substrate 20. When the liquid crystal device 100 is a transmissive-type liquid crystal device, both the element substrate 10 and the opposed substrate 20 are configured to have the light-transmissive property.

Detailed Configuration of Pixels

Figure 3A:
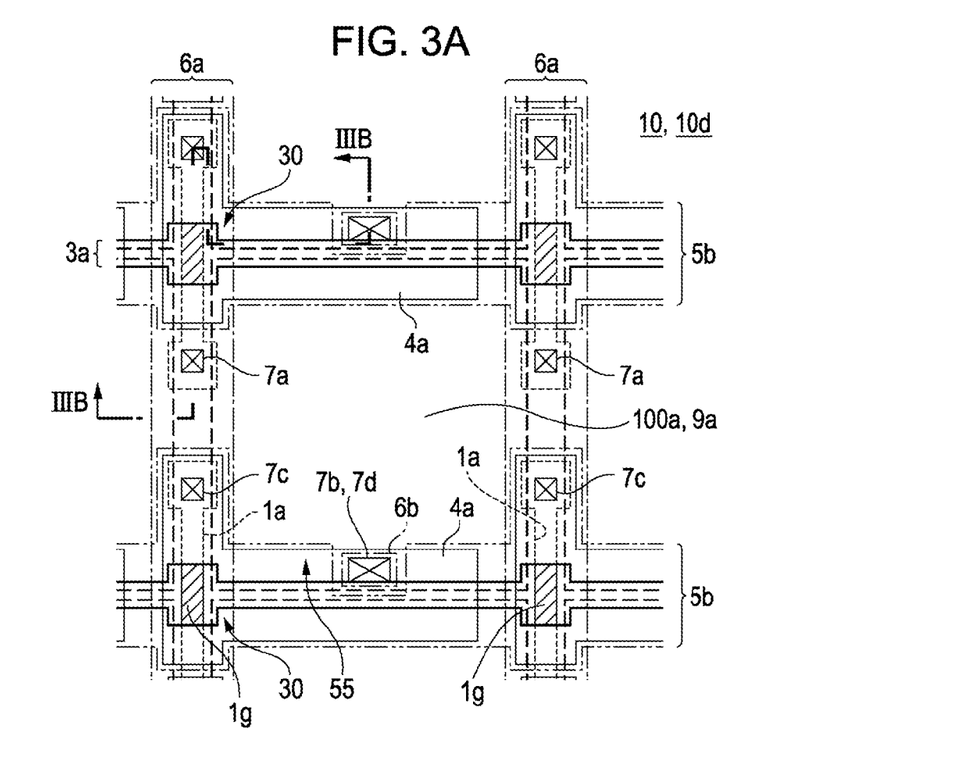
FIGS. 3A and 3B are explanatory drawings for explaining a pixel of the liquid crystal device according to the first embodiment.
Figure 3B:
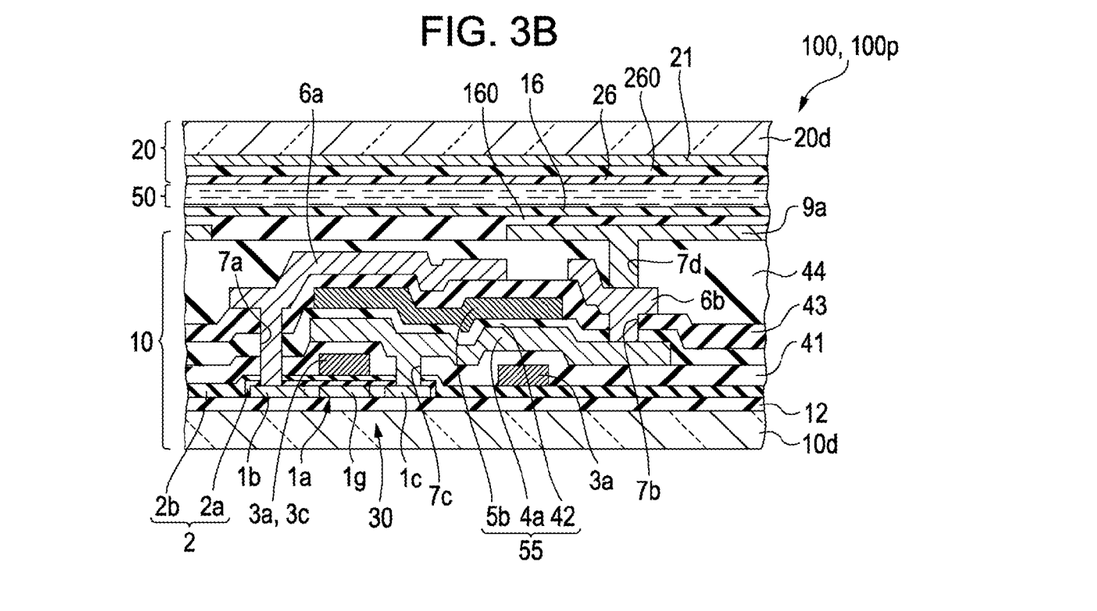

FIGS. 3A and 3B are explanatory drawings showing a pixel of the liquid crystal device 100 according to the first embodiment. FIG. 3A is a plan view showing adjacent pixels of the element substrate used in the liquid crystal device according to the first embodiment of the invention, FIG. 3B is a cross-sectional view of the liquid crystal device 100 taken along the line IIIB-IIIB in FIG. 3A. In FIG. 3A, semiconductor layers are shown by thin and short dot lines, the scanning lines 3a are shown by thick solid lines, the data lines 6a and thin films formed simultaneously therewith are shown by alternate long and short dash lines, the capacitance lines 5b are shown by alternate long and two short dash lines, the pixel electrodes 9a are shown by thick and long dot lines, and the lower electrode layers 4a are shown by thin solid lines.

As shown in FIG. 3A, in the element substrate 10, the pixel electrodes 9a having a rectangular shape are formed respectively in a plurality of pixels 100a on the element-substrate-side substrate body 10d, and the data lines 6a and the scanning lines 3a are formed along vertical and lateral boundary areas of the respective pixel electrodes 9a. The data lines 6a and the scanning lines 3a extend linearly and the pixel transistors 30 are formed at positions corresponding to intersections between the data lines 6a and the scanning lines 3a. The capacitance lines 5b are formed so as to be overlapped with the scanning lines 3a on the element-substrate-side substrate body 10d. In this embodiment, the capacitance lines 5b include primary line portions extending linearly so as to be overlapped with the scanning lines 3a, and secondary line portions extending so as to be overlapped with the data lines 6a at the intersections between the data lines 6a and the scanning lines 3a.

As shown in FIGS. 3A and 3B, the element substrate 10 includes the light-transmissive element-substrate-side substrate body 10d formed of a quartz substrate, a glass substrate, or a silicon substrate, the pixel electrodes 9a formed on the surface of the element-substrate-side substrate body 10d on the side of the liquid crystal layer 50, the pixel transistors 30 for switching pixels, and an alignment film 16. The opposed substrate 20 mainly includes the light-transmissive opposed-substrate-side substrate body 20d formed of a quartz substrate or a glass substrate, the common electrode 21 formed on the surface of the opposed-substrate-side substrate body 20d on the side of the liquid crystal layer 50, and an alignment film 26.

In the element substrate 10, the pixel transistors 30 are formed respectively in a plurality of pixels 100a. In each of the pixel transistors 30, a semiconductor layer 1a includes a channel area 1g opposing a gate electrode 3c formed of part of the scanning line 3a via a gate insulating layer 2, a source area 1b, and a drain area 1c. The source area 1b and the drain area 1c, each includes a low-density area and a high-density area. The semiconductor layer 1a is formed, for example, of a polycrystalline silicon film or the like formed on the element-substrate-side substrate body 10d via the dielectric film 12, and the gate insulating layer 2 has a two-layer structure including a silicon oxide film 2a formed by thermally oxidizing the semiconductor layer 1a and a CVD film 2b such as a silicon oxide film or a silicon nitride film formed by a CVD method. The gate insulating layer 2 includes a case of being formed only of the silicon oxide film or the silicon nitride film formed by the CVD method, or a case of being formed only of the silicon oxide film formed by thermally oxidizing the semiconductor layer 1a. A silicon film such as a polysilicon film, a amorphous silicon film, or a monocrystalline silicon film, or those having a polycide or silicide structure, or even a metal film may be used for the scanning lines 3a.

A first inter-layer film 41 formed of a silicon oxide film or the like is formed on an upper side of the scanning line 3a, and a lower electrode layer 4a is formed on an upper side of the first inter-layer film 41. The lower electrode layer 4a is formed in a substantially L-shape originating from a position of an intersection between the scanning line 3a and the data line 6a and extending along the scanning line 3a and the data line 6a. The lower electrode layer 4a is formed of a conductive polysilicon film or a metallic film or the like, and is electrically connected to the drain area 1c via contact holes 7c.

A dielectric layer 42 formed of a silicon nitride film or the like is formed on the upper side of the lower electrode layer 4a. The capacitance line 5b (upper electrode layer) is formed on the upper side of the dielectric layer 42 so as to oppose the lower electrode layer 4a via the dielectric layer 42, and the retention capacity 55 is made up of the capacitance line 5b, the dielectric layer 42 and the lower electrode layer 4a. The capacitance line 5b is formed of a metal layer, a conductive polysilicon film, a metal silicide film including refractory metal, or a laminated film including these films.

A second inter-layer dielectric film 43 formed of a silicon oxide film or the like is formed on the upper side of the capacitance line 5b, and the data line 6a and a drain electrode 6b are formed on the upper side of the second inter-layer dielectric film 43. The data line 6a is electrically connected to the source area 1b via a contact hole 7a. The drain electrode 6b is electrically connected to the lower electrode layer 4a via a contact hole 7b, and is electrically connected to the drain area 1c via the lower electrode layer 4a. The data line 6a and the drain electrode 6b are formed of a metal layer, a conductive polysilicon film, a metal silicide film including refractory metal, or a laminated film including these films.

A third inter-layer dielectric film 44 formed of a silicon oxide film or the like is formed on the upper side of the data line 6a and the drain electrode 6b. The third inter-layer dielectric film 44 is formed with a contact hole 7d which communicates with the drain electrode 6b. The pixel electrode 9a formed of a reflective metal film such as aluminum or aluminum alloy is formed on an upper side of the third inter-layer dielectric film 44, and the pixel electrode 9a is electrically connected to the drain electrode 6b via the contact hole 7d. In this embodiment, the surface of the third inter-layer dielectric film 44 is flat. The surface of the pixel electrode 9a is also flat.

The alignment film 16 is formed on the upper side of the pixel electrode 9a. The alignment film 16 is formed of a resin film such as polyimide, or a rhomble deposition film such as a silicon oxide film. In this embodiment, the alignment film 16 is an inorganic alignment film formed of a rhomble deposition film such as a silicon oxide film, and a dielectric film 160 such as a silicon oxide film or a silicon nitride film is formed between the alignment film 16 and the pixel electrode 9a. The surface of the dielectric film 160 is flat and thence the surface of the alignment film 16 is also flat.

In the opposed substrate 20, the common electrode 21 is formed on the surface of the opposed-substrate-side substrate body 20d on the side of the liquid crystal layer 50 (the surface opposing the element substrate 10), and the alignment film 26 is formed so as to cover the common electrode 21. The surface of the common electrode 21 is flat. The alignment film 26 is formed of a resin film such as polyimide or a rhomble deposition film such as silicon oxide film in the same manner as the alignment film 16. In this embodiment, the alignment film 26 is an inorganic alignment film formed of a rhomble deposition film such as a silicon oxide film, and a dielectric film 260 such as a silicon oxide film or a silicon nitride film is formed between the alignment film 26 and the common electrode 21. The surface of the dielectric film 260 is flat and hence the surface of the alignment film 26 is also flat.

Layer Thickness of Liquid Crystal Layer 50

Figure 4A:
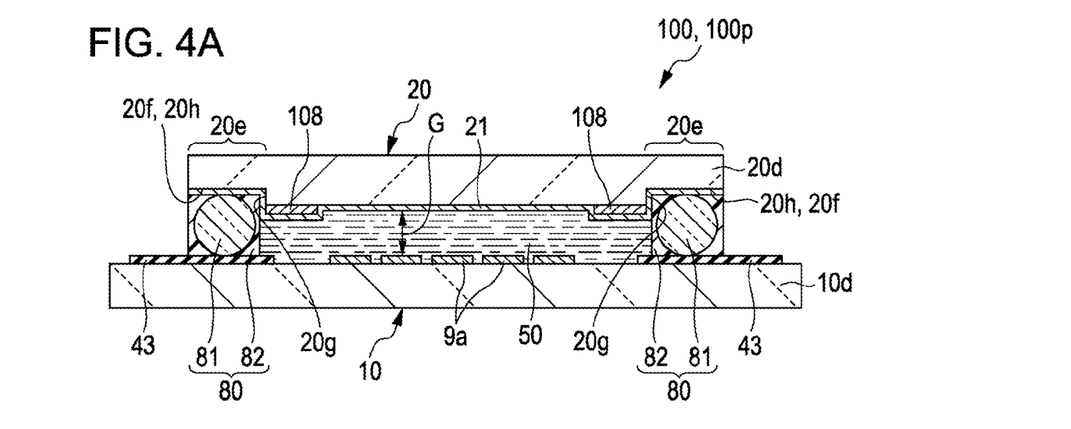
FIGS. 4A, 4B and 4C are explanatory drawings showing a configuration relating to layer thickness control for a liquid crystal layer in the liquid crystal device according to the first embodiment of the invention.
Figure 4B:
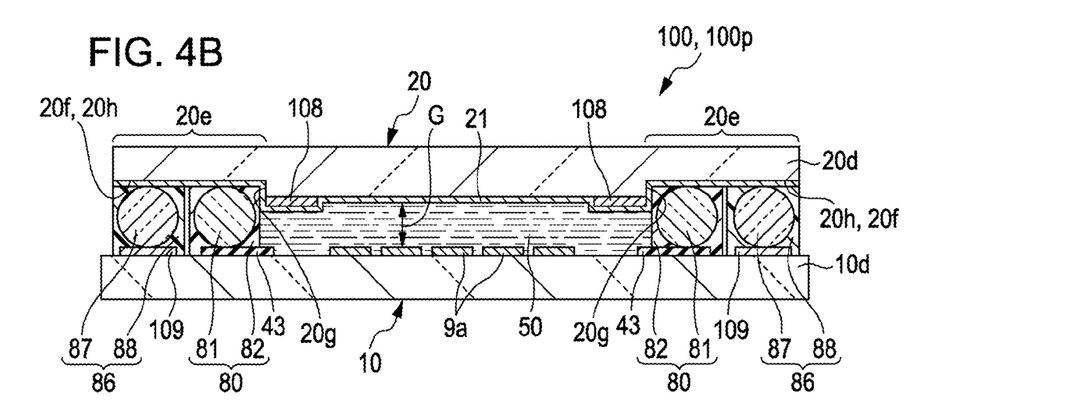
Figure 4C:
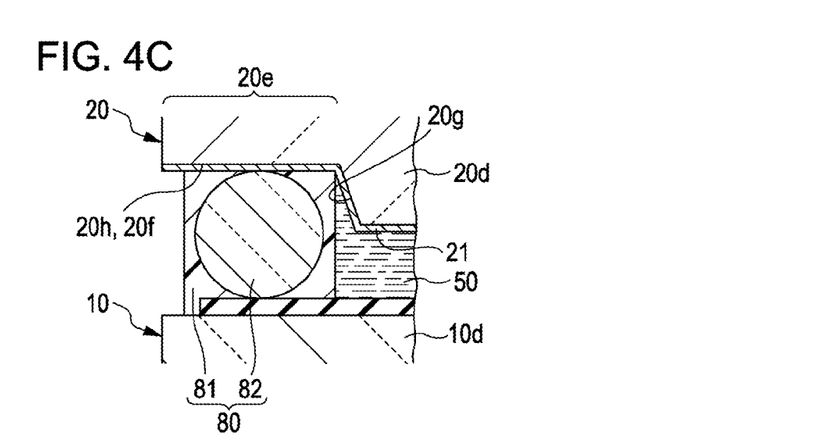

FIG. 4A to 4C are explanatory drawings schematically showing a configuration relating to layer thickness control for the liquid crystal layer 50 in the liquid crystal device 100 according to the first embodiment of the invention. FIG. 4A is a schematic cross-sectional view taken along the line IVA- IVA in FIG. 2A. FIG. 4B is a schematic cross-sectional view taken along the line IVB-IVB in FIG. 2A. FIG. 4C is an explanatory drawing showing a depressed portion formed on the opposed-substrate-side substrate body 20d in an enlarged scale. In FIGS. 4A to 4C, only films such as the pixel electrodes 9a, the inter-substrate conductive electrode 109, and the second inter-layer dielectric film 43 existing in the area overlapped with the sealing material 80 are illustrated on the element substrate 10, and only the common electrode 21 is illustrated on the opposed substrate 20. Although only one of the gap materials 81 contained in the sealing material 80 is shown In FIGS. 4A to 4C, the sealing material 80 includes a plurality of the gap materials 81 in the direction of the width of the sealing material 80.

In the liquid crystal device 100 in this embodiment, reduction of the layer thickness of the liquid crystal layer 50 is required in order to enhance the response of the liquid crystal layer 50. In the liquid crystal device 100, reduction of the layer thickness of the liquid crystal layer 50 to approximately half the layer thickness of the transmissive-type liquid crystal device is required in order to obtain the same brightness as the transmissive liquid crystal device. Therefore, in this embodiment, as shown in FIGS. 4A and 4B, in the area overlapped with the sealing material 80 in one of the element-substrate-side substrate body 10d used for the element substrate 10 and the opposed-substrate-side substrate body 20d used for the opposed substrate 20, a shoulder portion 20h is provided for increasing the distance between these substrate bodies in the area overlapped with the sealing material 80 to be larger than the distance between these substrate bodies in the area surrounded by the sealing material 80.

In this embodiment, the shoulder portion 20h is formed on the opposed-substrate-side substrate body 20d on the surface opposing the element substrate 10, and is depressed in the direction away from the 10d. The shoulder portion 20h is an area formed by cutting away part of the opposed-substrate-side substrate body 20d having a constant thickness. For example, the shoulder portion 20h is an area formed by cutting part of the opposed-substrate-side substrate body 20d having a thickness of 1.1 mm entirely by, for example, a width of approximately 2 mm to a depth of 0.4 μm via wet etching or dry etching. Therefore, the area in the opposed-substrate-side substrate body 20d formed with the shoulder portion 20h corresponds to a thin portion 20e.

Here, the shoulder portion 20h and the thin portion 20e includes a shoulder 20f formed on an outer peripheral edge of the opposed-substrate-side substrate body 20d, and the shoulder portion 20h and the thin portion 20e reach the outer peripheral edge of the opposed-substrate-side substrate body 20d. The common electrode 21 is formed entirely over the opposed-substrate-side substrate body 20d including the shoulder portion 20h and the thin portion 20e. The inter-substrate conductive material 86 is also provided at the position overlapped with the shoulder portion 20h and the thin portion 20e on the outside of the sealing material 80. The inter-substrate conductive material 86 includes a conductive particles 87 formed by providing plastic beads with a metal layer such as gold or silver on the surfaces thereof and provides continuity between the inter-substrate conductive electrode 109 formed on the element-substrate-side substrate body 10d and the common electrode 21. Therefore, the inter-substrate conductive electrode 109 is capable of supplying common potential to the common electrode 21 via the inter-substrate conductive material 86.

In this embodiment, the common electrode 21 is formed entirely over the opposed-substrate-side substrate body 20d including the shoulder portion 20h and the thin portion 20e. In this embodiment, a side surface 20g of the shoulder portion 20h is a tapered surface as shown in FIG. 4C. Therefore, even when the common electrode 21 is formed up to the shoulder portion 20h, breakage of the common electrode 21 due to the level difference can hardly occur on the side surface 20g of the shoulder portion 20h.

In the liquid crystal device 100 configured in this manner, the outer diameter of the gap material 81 used also in the sealing material 80 is 2.3 μm. However, in the liquid crystal device 100 in this embodiment, the thin portion 20e is provided in the area overlapped with the sealing material 80 by the shoulder 20f having a depth of 0.6 μm. Therefore, the gap material 81 having an outer diameter of 2.3 μm is interposed between the element substrate 10 and the opposed substrate 20 in a state in which the element substrate 10 and the opposed substrate 20 are bonded with the sealing material 80. However, a gap G between the element substrate 10 and the opposed substrate 20 is 1.8 μm, and the layer thickness of the liquid crystal layer 50 is 1.8 μm in the area surrounded by the sealing material 80.

The relationship between the outer diameter of the gap material 81 and the layer thickness of the liquid crystal layer 50 (the result of simulation) in a case where the depth of the shoulder portion 20h formed on the opposed-substrate-side substrate body 20d is varied is as shown in Table 1.

TABLE 1

|  |  | Outer Diameter of Gap Material 81 | | |
| --- | --- | --- | --- | --- |
|  |  | 2.3 μm | 2.4 μm | 2.6 μm |
| Depth of | 0.4 | 2.0 μm | 2.1 μm | 2.3 μm |
| Shoulder | 0.5 | 1.9 μm | 2.0 μm | 2.2 μm |
| Portion 20 h | 0.6 | 1.8 μm | 1.9 μm | 2.1 μm |
| (amount of | 0.7 | 1.7 μm | 1.8 μm | 2.0 μm |
| cutting out on | 0.8 | 1.6 μm | 1.7 μm | 1.9 μm |
| opposed | 0.9 | 1.5 μm | 1.6 μm | 1.8 μm |
| substrate) | 1.0 | 1.4 μm | 1.5 μm | 1.7 μm |
| (μm) | 1.1 | 1.3 μm | 1.4 μm | 1.6 μm |
|  | 1.2 | 1.2 μm | 1.3 μm | 1.5 μm |

There is a difference of approximately 0.1 μm between a value calculated by subtracting the depth of the shoulder portion 20h from the outer diameter of the gap material 81 and the thickness of the liquid crystal layer 50. Such difference is caused by the thicknesses of the pixel electrodes 9a formed on the element substrate 10 and, the second inter-layer dielectric film 43.

Manufacturing Method

Figure 5A:
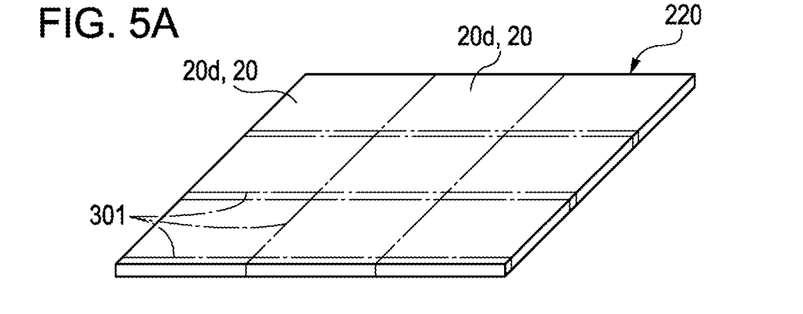
FIGS. 5A, 5B and 5C are explanatory drawings showing a method of manufacturing the liquid crystal device according to the first embodiment of the invention.
Figure 5B:
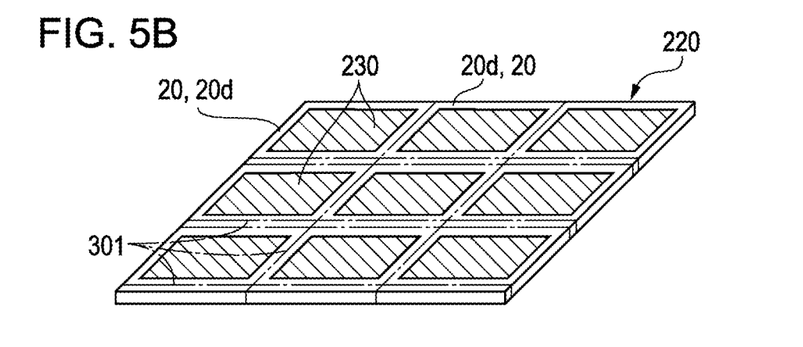
Figure 5C:
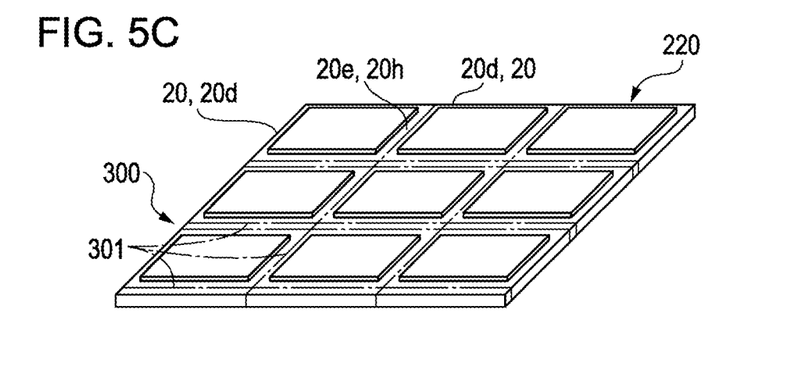

FIG. 5 and FIG. 6 are explanatory drawing showing a method of manufacturing the liquid crystal device 100 according to the first embodiment of the invention. The liquid crystal device 100 can be manufactured by preparing a the element substrate 10 having dimensions of a single piece and the opposed substrate 20 having dimensions of a single piece and bonding the same. However, in this embodiment, a large-sized substrate for opposed substrates and a large-sized substrate for element substrates from which a number of pieces of the element substrates 10 and the opposed substrate 20 can be cut out respectively are used until the bonding step as described below with reference to FIGS. 5A to FIG. 6D.

First of all, as described below with reference to FIGS. 5A to 5B and FIGS. 6A to 6B, a large-sized substrate 210 for element substrates and a large-sized substrate 220 for opposed substrates from which a number of pieces of the element substrates 10 and the opposed substrates 20 can be cut out respectively are used. More specifically, as shown in FIG. 5A, the large-sized substrate 220 for opposed substrates from which a number of pieces of the opposed substrates 20 can be cut out is prepared. In the large-sized substrate 220 for opposed substrates, areas surrounded by predetermined cutting lines shown by alternate long and short dash lines 301 are areas to be cut out as the opposed-substrate-side substrate bodies 20d.

Subsequently, as shown in FIG. 5B, areas in the large-sized substrate 220 for opposed substrates to be cut out as the opposed-substrate-side substrate bodies 20d located inside of an outer peripheral edges thereof by a predetermined dimension are covered with etching masks 230, and portions of the opposed-substrate-side substrate bodies 20d exposed from the etching masks 230 are subjected to etching by wet etching using hydrofluoric acid etching liquid or dry etching using fluorinated gas.

Subsequently, when the etching masks 230 are removed, the shoulder portion 20h (thin portion 20e) is formed on the large-sized substrate 220 for opposed substrates along the outer peripheral edges of the areas to be cut out as the opposed-substrate-side substrate bodies 20d. By setting conditions of the wet etching and the dry etching so that side etching tends to occur, the side surface 20g of the shoulder portion defined by the formation of the shoulder portion 20h can be formed into a tapered shape as described above in conjunction with FIG. 4C.

Subsequently, the edge frame 108, the common electrode 21, and the alignment film 26 (see FIGS. 2A and 2B, FIGS. 3A and 3B) described in conjunction with FIG. 1 to FIG. 4C are formed on the opposed-substrate-side substrate body 20d.

Figure 6A:
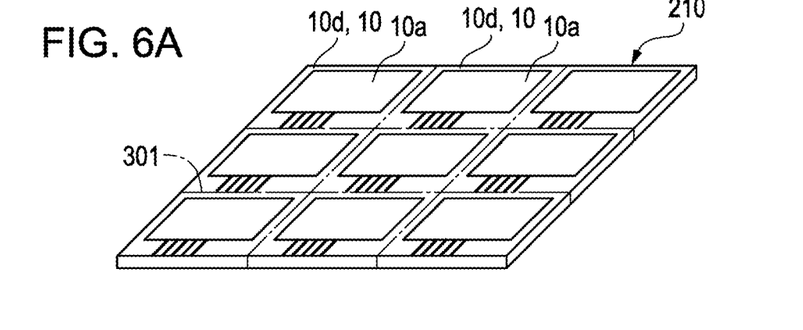
FIGS. 6A, 6B, 6C, and 6D are explanatory drawings showing a method of manufacturing a liquid crystal device according to the first embodiment of the invention.

In contrast, as shown in FIG. 6A, in the large-sized substrate 210 for element substrate from which a number of pieces of element substrates 10 (element-substrate-side substrate bodies 10d) can be cut out, areas surrounded by the predetermined cutting lines shown by alternate long and short dash lines 301 are areas to be cut out as the element-substrate-side substrate bodies 10d, and the pixel transistor 30, the pixel electrode 9a, the inter-substrate conductive electrode 109, the alignment film 16 (see FIGS. 2A and 2B, FIGS. 3A and 3B) are formed on each of these areas.

Figure 6B:
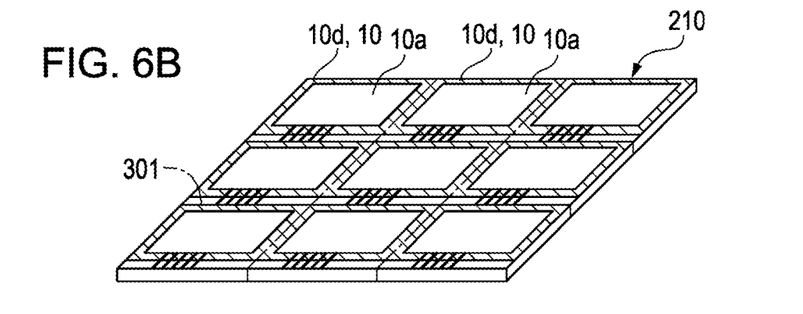

Subsequently, as shown in FIG. 6B, in the large-sized substrate 210 for element substrates, the sealing materials 80 including the gap materials 81 are applied on the areas to be cut out as the element-substrate-side substrate bodies 10d so as to surround the peripheries of the image display areas 10a. At that time, each of the sealing materials 80 is formed with a liquid crystal injection port 83 (see FIG. 2A) defined by a disconnected portion.

Figure 6C:
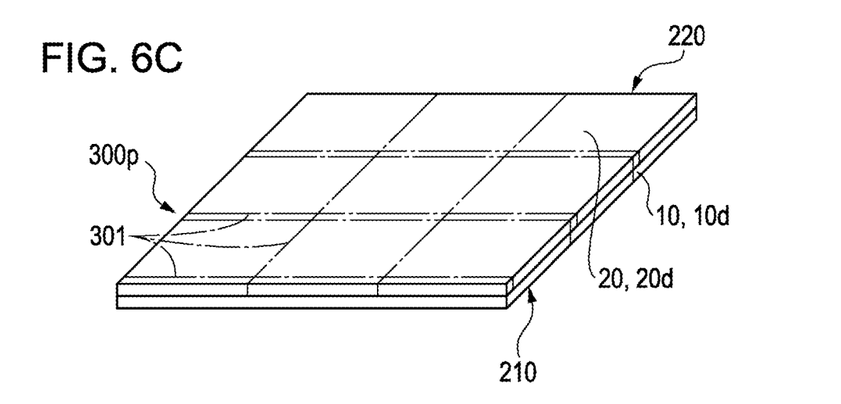
Figure 6D:
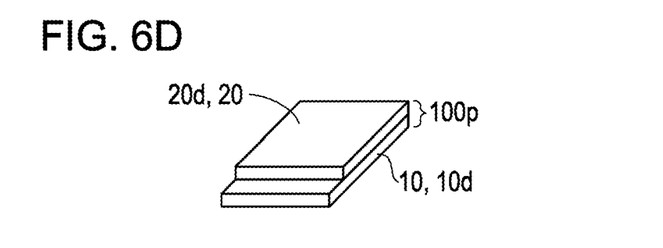

Subsequently, as shown in FIG. 6C, a surface of the large-sized substrate 210 for element substrates formed with the pixel electrodes 9a and a surface of the large-sized substrate 220 for opposed substrates formed with the common electrode 21 and the shoulder portion 20h are joined to each other with the intermediary of the sealing materials 80, and the sealing materials 80 are solidified. Consequently, a large panel structure 300p is formed. The sealing materials 80 may be applied on the side of the large-sized substrate 220 for opposed substrates to bond the large-sized substrate 210 for element substrates and the large-sized substrate 220 for opposed substrates to each other. In any cases, the sealing materials 80 are arranged at positions overlapped with the shoulder portions 20h (thin portion 20e) of the opposed-substrate-side substrate bodies 20d.

Subsequently, the large panel structure 300p is cut along the predetermined cutting lines to obtain liquid crystal panels 100p each having dimensions of a single piece. At a timing when the liquid crystal injection port 83 of the sealing material 80 is exposed during the cutting operation, liquid crystal is injected in a vacuum. Then, as shown in FIG. 2A, the liquid crystal injection port 83 is filled with sealing resin.

A manufacturing method including applying the sealing materials 80 in an annular shape on the large-sized substrate 210 for element substrates (element substrates 10) or the large-sized substrate 220 for opposed substrates (opposed substrates 20), providing the interior of areas surrounded by the sealing materials, then bonding the large-sized substrate 210 for element substrates (element substrates 10) and the large-sized substrate 220 for opposed substrates (opposed substrates 20) with the sealing materials 80 may also be employed.

Main Advantages of the Embodiment

As described above, in the reflective liquid crystal device 100 in the embodiment, the shoulder portion 20h configured to set the distance between the opposed-substrate-side substrate body 20d (one of the substrate bodies) and the element-substrate-side substrate body 10d (the other substrate body) in the area overlapped with the sealing material 80 to be larger than the distance between the opposed-substrate-side substrate body 20d and the element-substrate-side substrate body 10d in the area surrounded by the sealing material 80 is formed in the area overlapped with the sealing material 80 including the gap material 81. Therefore, while the gap between the element substrate 10 an the opposed substrate 20 is large in the area overlapped with the sealing material 80, the gap between the element substrate 10 and the opposed substrate 20 is small in the area inside the sealing material 80. Therefore, the layer thickness of the liquid crystal layer 50 can be reduced without reducing the size of the gap material 81, so that improvement of the response of the liquid crystal layer 50 is achieved.

Since the shoulder portion 20h is provided on the opposed-substrate-side substrate body 20d, there is such advantage that it is not necessary to increase the size of the opposed-substrate-side substrate body 20d. More specifically, the shoulder portion 20h may be provided on the element-substrate-side substrate body 10d. However, since wiring or the like are often formed on the element-substrate-side substrate body 10d in the area overlapped with the sealing material 80, formation of useless shoulders in the area where the wiring is provided is preferably avoided. Therefore, when providing the shoulder portion 20h on the element-substrate-side substrate body 10d, there are many constrains such that the shoulder portion 20h needs to be provided in an area except for positions where the wiring passes through. Therefore, although the element substrate 10 is upsized if the shoulder portion 20h is provided on the element substrate 10, it is not necessary to upsize the opposed substrate 20 when the shoulder portion 20h is provided on the element substrate 10 because there is no such constraints.

In this embodiment, the inter-substrate conductive material 86 which provides continuity between the inter-substrate conductive electrode 109 on the side of the element substrate 10 and the common electrode 21 on the side of the opposed substrate 20 in the area overlapped with the shoulder portion 20h is provided between the element substrate 10 and the opposed substrate 20. Here, the inter-substrate conductive material 86 is prepared by blending the conductive particles 87 such as silver powder or gold plated fibers in the resin component 88. Therefore, the element substrate 10 side and the opposed substrate 20 side can be brought into continuity without using the small sized conductive particles 87 by providing the inter-substrate conductive material 86 in the area overlapped with the shoulder portion 20h.

In the opposed-substrate-side substrate body 20d, since the side surface 20g of the shoulder portion defined by the shoulder portion 20h is tapered, even when the common electrode 21 is provided on the side surface 20g of the shoulder portion 20h, breakage of the common electrode 21 can hardly occur.

Since the shoulder portion 20h is formed by etching with respect to the opposed-substrate-side substrate body 20d, the shoulder portion 20h can be formed efficiently on a large number of pieces of the opposed-substrate-side substrate bodies 20d in comparison with the case of being formed by machining such as grinding or the like.

Second Embodiment

Figure 7A:
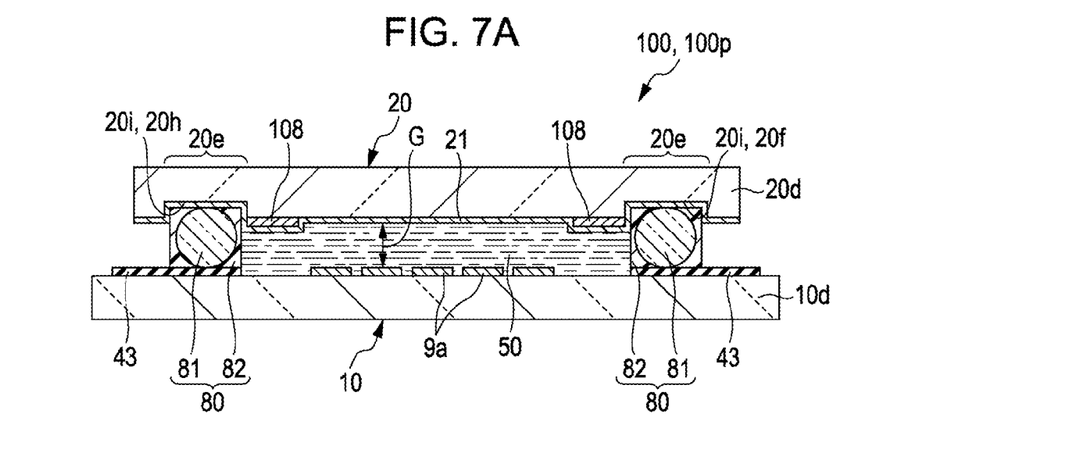
FIGS. 7A and 7B are explanatory drawings showing a configuration relating to film thickness control for a liquid crystal layer in the liquid crystal device according to a second embodiment of the invention.
Figure 7B:
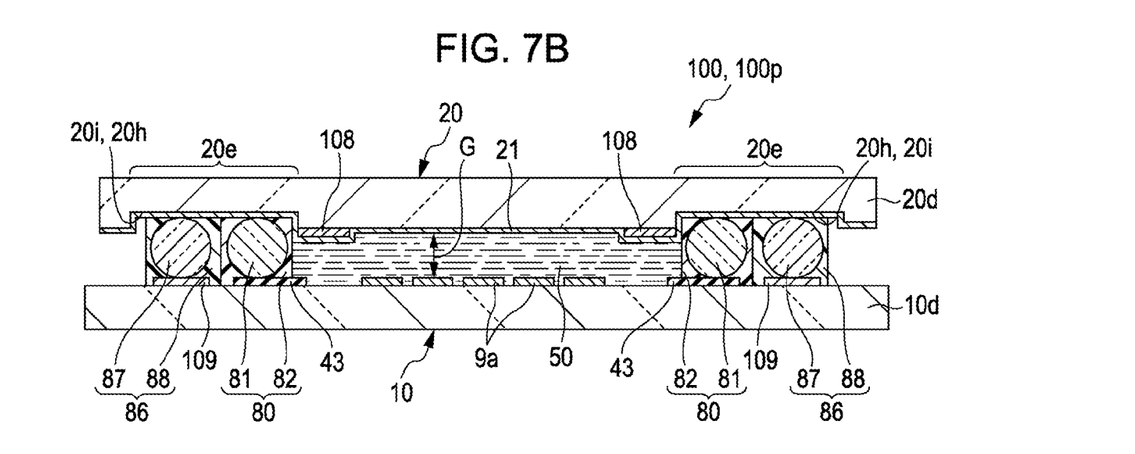

FIGS. 7A and 7B are explanatory drawing schematically showing a configuration relating to layer thickness control for the liquid crystal layer 50 in the liquid crystal device 100 according to a second embodiment of the invention. FIG. 7A is a cross-sectional view taken along the line VIIA-VIIA in FIG. 2A. FIG. 7B is a cross-sectional view taken along the line VIIB-VIIB in FIG. 2A. FIG. 7C is an explanatory drawing showing a depressed portion formed on the opposed-substrate-side substrate body 20d in an enlarged scale. In FIGS. 7A and 7B, only films such as the pixel electrodes 9a, the inter-substrate conductive electrode 109, and the second inter-layer dielectric film 43 existing in the area overlapped with the sealing material 80 are illustrated on the element substrate 10, and only the common electrode 21 is illustrated on the opposed substrate 20. Basic configurations of the second embodiment are the same as those in the first embodiment, common parts are illustrated with the same reference signs, and description thereof is omitted.

In the first embodiment, when forming the shoulder portion 20h and the thin portion 20e on the opposed substrate 20, the shoulder 20f is formed on the outer peripheral edge of the opposed-substrate-side substrate body 20d. However, in the second embodiment, a groove 20i is provided on the opposed-substrate-side substrate body 20d inside the outer peripheral edge at a predetermined distance therefrom as shown in FIG. 7. The shoulder portion 20h and the thin portion 20e are defined by the groove 20i on the opposed-substrate-side substrate body 20d.

In the opposed substrate 20 configured in this manner, the sealing material 80 including the gap materials 81 serves to bond the opposed substrate 20 and the element substrate 10 in the area overlapped with the shoulder portion 20h and the thin portion 20e. The inter-substrate conductive material 86 is also provided at the position overlapped with the shoulder portion 20h and the thin portion 20e on the outside of the sealing material 80.

Therefore, with the liquid crystal device 100 in the second embodiment, while the gap between the element substrate 10 and the opposed substrate 20 is large in the area overlapped with the sealing material 80, the gap between the element substrate 10 and the opposed substrate 20 is small in the area inside the sealing material 80 as in the first embodiment. Therefore, the layer thickness of the liquid crystal layer 50 can be reduced without reducing the size of the gap materials 81, so that the same advantages as the first embodiment such as improvement of the response of the liquid crystal layer 50 are also achieved.

Other Embodiments

In the embodiments described above, the shoulder portion 20h and the thin portion 20e are provided on the opposed-substrate-side substrate body 20d. However, the shoulder portion 20h and the thin portion 20e may be provided on the element-substrate-side substrate body 10d in the area overlapped with the sealing material 80. It is also possible to provide the shoulder portion 20h and the thin portion 20e both on the opposed-substrate-side substrate body 20d and the element-substrate-side substrate body 10d in the areas overlapped with the sealing material 80.

In the embodiments described above, the shoulder portion 20h and the thin portion 20e are formed by etching. However, the shoulder portion 20h and the thin portion 20e may be formed by machining such as grinding. Alternatively, the shoulder portion 20h and the thin portion 20e may be formed by molding when manufacturing the element-substrate-side substrate body 10d or the opposed-substrate-side substrate body 20d.

Example of Mounting of Liquid Crystal Device 100 on Electronic Apparatus

Figure 8A:
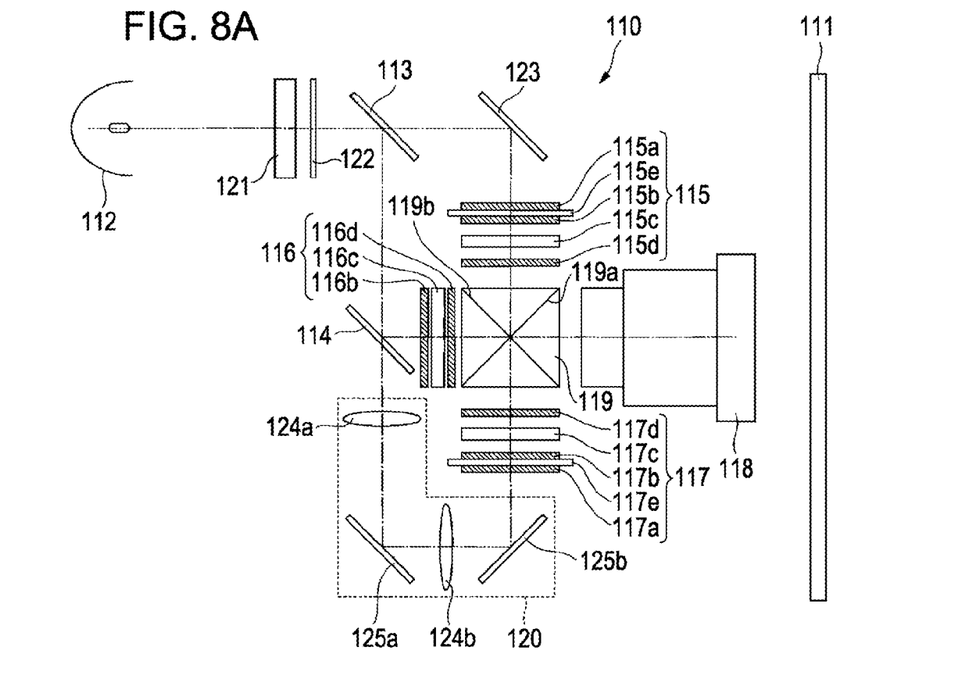
FIGS. 8A and 8B are rough configuration drawings showing projecting-type display devices using the liquid crystal device to which the invention is applied.
Figure 8B:
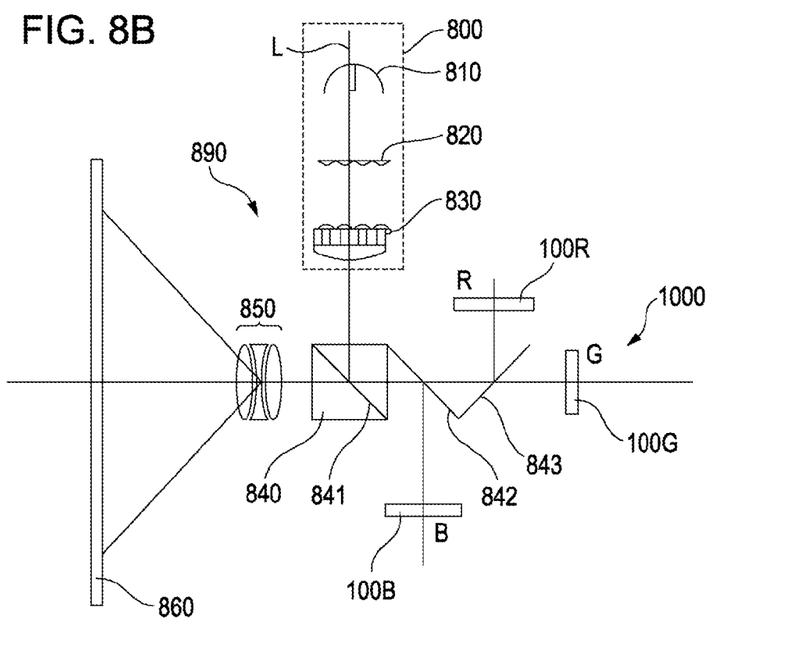

Referring now to FIGS. 8A and 8B, an electronic apparatus to which the liquid crystal device 100 according to the embodiments is applied will be described. FIGS. 8A and 8B are schematic configuration drawings showing projecting-type display devices (electronic apparatuses) employing the liquid crystal device to which the invention is applied. FIG. 8A is an explanatory drawing showing the projecting-type display device (electronic apparatus) employing the transmissive liquid crystal device 100, and FIG. 8B is an explanatory drawing showing the projecting-type display device (electronic apparatus) employing the reflective liquid crystal device 100.

First Example of Projecting-Type Display Device

A projecting-type display device 110 shown in FIG. 8A is so-called a projecting-type display configured in such a manner that a screen 111 provided on the observer side is irradiated with light and the light reflected from the screen 111 is observed. The projecting-type display device 110 includes a light source 112, dichroic mirrors 113 and 114, liquid crystal light valves 115 to 117 (display device 110), a projecting optical system 118, a cross dichroic prism 119, and a relay system 120.

The light source 112 includes an extra-high pressure mercury lamp configured to supply light including red light, green light, and blue light. A dichroic mirror 113 is configured to allow passage of the red light from the light source 112 therethrough, and reflect the green light and the blue light. The dichroic mirror 114 is configured to allow passage of the blue light reflected from the dichroic mirror 113 therethrough, and reflects the green light reflected from the dichroic mirror 113 therefrom. In this manner, the dichroic mirrors 113 and 114 constitute a color separation optical system which separates light emitted from the light source 112 into the red light, the green light, and the blue light.

Here, an integrator 121 and a polarization conversion element 122 are arranged between the dichroic mirror 113 and the light source 112 in this sequence from the light source 112. The integrator 121 has a configuration to uniformize illuminance distribution of light emitted from the light source 112. The polarization conversion element 122 has a configuration to convert the light from the light source 112 into a polarized light having a specific direction of vibrations such as s-polarized light.

The liquid crystal light valve 115 is a transmissive-type liquid crystal device (the liquid crystal device 100) configured to modulate the red light passed through the dichroic mirror 113 and reflected from the reflection mirror 123 according to image signal. The liquid crystal light valve 115 includes a λ/2 wave plate 115a, a first polarizing plate 115b, a liquid crystal panel 115c, and a second polarizing plate 115d. Here, the red light entering the liquid crystal light valve 115 remains s-polarized light because the polarization of the red light is not changed by passing through the dichroic mirror 113.

The λ/2 wave plate 115a is an optical element which converts the s-polarized light entering the liquid crystal light valve 115 into p-polarized light. The first polarizing plate 115b is a polarizing plate which blocks the s-polarized light and allows the p-polarized light to pass through. The liquid crystal panel 115c has a configuration to convert the p-polarized light into the s-polarized light (circularly polarized light or elliptically polarized light if it is half tone) by the modulation according to the image signal. In addition, the second polarizing plate 115d is a polarizing plate which blocks the p-polarized light and allows the s-polarized light to pass through. Therefore, the liquid crystal light valve 115 modulates the red light according to the image signal and ejects modulated red light toward a cross dichroic prism 119.

The λ/2 wave plate 115a and the first polarizing plate 115b are arranged in a state of being in contact with a light-transmissive glass plate 115e, so that distortion of the λ/2 wave plate 115a and the first polarizing plate 115b due to heat generation is avoided.

A liquid crystal light valve 116 is a transmissive-type liquid crystal device configured to modulate green light reflected from the dichroic mirror 113 and then reflected from the dichroic mirror 114 according to image signal. The liquid crystal light valve 116 includes a first polarizing plate 116b, a liquid crystal panel 116c, and a second polarizing plate 116d in the same manner as the liquid crystal light valve 115. Green light entering the liquid crystal light valve 116 is s-polarized light entering thereto after having reflected from the dichroic mirrors 113 and 114. The first polarizing plate 116b is a polarizing plate which blocks the p-polarized light and allows the s-polarized light to pass through. The liquid crystal panel 116c has a configuration to convert the s-polarized light into the p-polarized light (circularly polarized light or elliptically polarized light if it is half tone) by the modulation according to the image signal. The second polarizing plate 116d is a polarizing plate which blocks the s-polarized light and allows the p-polarized light to pass through. Therefore, the liquid crystal light valve 116 is configured to modulate the green light according to the image signal and eject the modulated green light toward the cross dichroic prism 119.

A liquid crystal light valve 117 is a transmissive-type liquid crystal device configured to modulate blue light reflected from the dichroic mirror 113, then passed through the dichroic mirror 114, and then passed through the relay system 120 according to the image signal. The liquid crystal light valve 117 includes a λ/2 wave plate 117a, a first polarizing plate 117b, a liquid crystal panel 117c, and liquid crystal panel 117d in the same manner as the liquid crystal light valves 115 and 116. Here, the blue light entering the liquid crystal light valve 117 is s-polarized light because it is reflected from the dichroic mirror 113, then passes through the dichroic mirror 114, and then is reflected from two reflection mirrors 125a and 125b of the relay system 120 described later.

The λ/2 wave plate 117a is an optical element which converts the s-polarized light entering the liquid crystal light valve 117 into p-polarized light. The first polarizing plate 117b is a polarizing plate which blocks the s-polarized light and allows the p-polarized light to pass therethrough. The liquid crystal panel 117c has a configuration to convert the p-polarized light into the s-polarized light (circularly polarized light or elliptically polarized light if it is half tone) by the modulation according to the image signal. In addition, the second polarizing plate 117d is a polarizing plate which blocks the p-polarized light and allows the s-polarized light to pass therethrough. Therefore, the liquid crystal light valve 117 modulates the blue light according to the image signal and ejects the modulated blue light toward the cross dichroic prism 119. The λ/2 wave plate 117a and the first polarizing plate 117b are arranged in a state of being in contact with the glass plate 117e.

The relay system 120 includes relay lenses 124a and 124b and the reflection mirrors 125a and 125b. The relay lenses 124a and 124b are provided for preventing optical loss caused because the optical path of the blue light is long. Here, the relay lens 124a is arranged between the dichroic mirror 114 and the reflection mirror 125a. The relay lens 124b is arranged between the reflection mirrors 125a and 125b. The reflection mirror 125a is arranged so as to reflect the blue light passed through the dichroic mirror 114 and then ejected from the relay lens 124a toward the relay lens 124b. The reflection mirror 125b is arranged so as to reflect the blue light ejected from the relay lens 124b toward the liquid crystal light valve 117.

The cross dichroic prism 119 is a light combining optical system having two dichroic films 119a and 119b arranged so as to be orthogonal to each other into an X-shape. The dichroic film 119a is a film that reflects blue light and allows green light to pass therethrough, and the dichroic film 119b is a film that reflects red light and allows green light to pass therethrough. Therefore, the cross dichroic prism 119 combines red light, green light and blue light modulated respectively by liquid crystal light valves 115 to 117 and ejects the same toward the projecting optical system 118.

Light entering the cross dichroic prism 119 from the liquid crystal light valves 115 and 117 is s-polarized light, and light entering the cross dichroic prism 119 from the liquid crystal light valve 116 is p-polarized light. In this manner, by differentiating polarization of lights entering the cross dichroic prism 119, the lights entering from the liquid crystal light valves 115 to 117 can be combined effectively by the cross dichroic prism 119. Here, the dichroic films 119a and 119b are generally superior in reflecting property for s-polarized light. Therefore, red light and blue light reflected from the dichroic films 119a and 119b are set to be s-polarized light and green light passing through the dichroic films 119a and 119b is set to be p-polarized light. The projecting optical system 118 includes a projecting lens (not shown), and is configured to project the light combined by the cross dichroic prism 119 onto the screen 111.

Second Example of Projecting-type Display Device

In a projecting-type display device 1000 shown in FIG. 8B, a light source unit 890 includes a polarized lighting system 800 having a light source 810, an integrator lens 820, and a polarization conversion element 830 arranged along a system optical axis L. The light source unit 890 includes a polarization beam splitter 840 configured to reflect a s-polarized luminous flux emitted from the polarized lighting system 800 by an S-polarized optical flux reflection surface 841, a dichroic mirror 842 configured to separate a blue light (B) component from light reflected from the S-polarized optical flux reflection surface 841 of the polarization beam splitter 840, and a dichroic mirror 843 configured to reflect a red light (R) component and separating the same from a luminous flux after having separated the blue light.

The projecting-type display device 1000 includes three reflective-type liquid crystal devices 100 (liquid crystal device 100R, 100G and 100B) allowing entry of respective colored lights. The light source unit 890 supplies predetermined colored lights to the three liquid crystal devices 100 (liquid crystal device 100R, 100G and 100B).

The projecting-type display device 1000 is configured to combine lights modulated by the liquid crystal devices 100R, 100G, 100B by dichroic mirrors 842 and 843 and the polarization beam splitter 840, and then project the obtained combined light onto a projected member such as a screen 860 by a projecting optical system 850.

The projecting-type display device may be configured to employ a LED light source or the like which ejects respective colored lights as a light source unit, and supply colored lights ejected from such the LED light source respectively to separate liquid crystal devices.

Other Electronic Apparatuses

The liquid crystal device 100 to which the invention is applied may be used for electronic apparatuses such as cellular phone sets, information mobile terminals (PDA: Personal Digital Assistants), digital still cameras, liquid crystal TV sets, view-finder type and monitor direct view video tape recorders, car navigation systems, pagers, electronic notepads, calculators, word processors, work stations, TV telephone sets, POS terminals, and apparatuses having a touch panel, and so on in addition to the above-described projecting-type display device (electronic apparatus).

What is claimed is:

1. A liquid crystal device comprising:
    an element substrate having a plurality of pixel electrodes on one surface thereof;
    an opposed substrate holding a liquid crystal layer in cooperation with the one surface of the element substrate; and
    a sealing material including a gap material that controls a distance between the element substrate and the opposed substrate and bonds the element substrate and the opposed substrate to each other, the sealing material having a first side extending along a first direction, a second side extending along a second direction crossing the first direction, a third side that opposes the first side, and a fourth side that opposes the second side,
    wherein at least one of the element substrate and the opposed substrate has a shoulder portion provided in an area overlapped with the sealing material for increasing the distance between the element substrate and the opposed substrate in the area overlapped with the sealing material to be larger than the distance between the element substrate and the opposed substrate in an area surrounded by the sealing material, and
    wherein an inter-substrate conductive material is provided between the element substrate and the opposed substrate in an area overlapped with the shoulder portion such that the inter-substrate conductive material electrically connects an electrode on the element substrate to another electrode on the opposed substrate, and the electrode on the element substrate is disposed outside of the sealing material at a crossing part of the first side of the sealing material and the second side of the sealing material,
    wherein
        the first side has a first outer edge and a first inner edge,
        the second side has a second outer edge and a second inner edge, and
        the electrode on the element substrate and the inter-substrate conductive material are disposed in an area that is surrounded by an extension of the first outer edge, an extension of the first inner edge, an extension of the second outer edge, and an extension of the second inner edge.

2. The liquid crystal device according to claim 1, wherein the shoulder portion is provided on the opposed substrate.

3. The liquid crystal device according to claim 2, wherein the shoulder portion is provided on an outer peripheral edge of the opposed substrate.

4. The liquid crystal device according to claim 2, wherein the shoulder portion is defined by a groove provided inside the outer peripheral edge of the opposed substrate at a distance therefrom.

5. The liquid crystal device according to claim 1, wherein a side surface of the shoulder portion is tapered.

6. The liquid crystal device according to claim 1, wherein the shoulder portion is formed by etching with respect to the at least one of the element substrate and the opposed substrate.

7. The liquid crystal device according to claim 1, wherein the liquid crystal device is a reflective liquid crystal device and one of the element substrate and the opposed substrate includes a reflective layer configured to reflect light incident from the other substrate toward the other substrate.

8. An electronic equipment comprising the liquid crystal device according to claim 1.

9. The electronic apparatus according to claim 8, comprising a light source unit configured to supply light to the liquid crystal device and a projecting optical system configured to project light modulated by the liquid crystal device.

10. A liquid crystal device comprising:
    an element substrate having a plurality of pixel electrodes;
    an opposed substrate disposed oppositely to the element substrate;
    a liquid crystal layer disposed between the element substrate and the opposed substrate;
    a sealing material that seals the liquid crystal layer, the sealing material including a gap material that controls a distance between the element substrate and the opposed substrate, the sealing material having a first side extending along a first direction, a second side extending along a second direction crossing the first direction, a third side that opposes the first side, and a fourth side that opposes the second side; and
    an inter-substrate conductive material that electrically connects an electrode of the element substrate and an electrode of the opposed substrate,
    wherein:
        the liquid crystal device, when viewed from a direction from the opposed substrate to the element substrate, has a first area and a second area, the second area being disposed outside of the first area, the sealing material being overlapped with the second area, the inter-substrate conductive material being overlapped with the second area, the inter-substrate conductive material and the electrode of the element substrate being disposed outside of the sealing material at a crossing part of the first side of the sealing material and the second side of the sealing material,
        the distance between the element substrate and the opposed substrate is larger at the second area than at the first area,
        the first side has a first outer edge and a first inner edge,
        the second side has a second outer edge and a second inner edge, and
        the electrode on the element substrate and the inter-substrate conductive material are disposed in an area that is surrounded by an extension of the first outer edge, an extension of the first inner edge, an extension of the second outer edge, and an extension of the second inner edge.

11. The liquid crystal device according to claim 10, wherein
    at least one of the element substrate and the opposed substrate has a first surface at the first area and a second surface at the second area;

the other of the element substrate and the opposed substrate has a third surface opposing the first surface and the second surface; and a distance between the second surface and the third surface is larger than a distance between the first surface and the third surface.

12. The liquid crystal device according to claim 10, wherein the inter-substrate conductive material is disposed between the sealing material and an edge of the element substrate.

* * * * *